United States Patent [19]

Kadakia et al.

[11] Patent Number: 4,819,823
[45] Date of Patent: Apr. 11, 1989

[54] SAFETY PRESSURE RELIEF DEVICE AND METHOD FOR MAKING THE SAME

[75] Inventors: Dixit B. Kadakia, Tulsa; Wayne V. Wright, Cushing, both of Okla.

[73] Assignee: BS & B Safety Systems, Inc., Tulsa, Okla.

[21] Appl. No.: 183,420

[22] Filed: Apr. 18, 1988

Related U.S. Application Data

[63] Continuation of Ser. No. 018,206, Feb. 24, 1987, abandoned.

[51] Int. Cl.[4] ............................................. F16K 13/04
[52] U.S. Cl. ........................................................ 220/89 A
[58] Field of Search ............................................. 220/89 A

[56]  References Cited

U.S. PATENT DOCUMENTS

| | | |
|---|---|---|
| 2,523,068 | 9/1950 | Simpson et al. . |
| 2,716,506 | 8/1955 | Fike .................................. 220/89 A |
| 2,953,279 | 9/1960 | Coffman . |
| 3,091,359 | 5/1963 | Wood . |
| 3,109,554 | 11/1963 | Porter et al. ..................... 220/89 A |
| 3,121,509 | 2/1964 | Porter ............................... 220/89 A |
| 3,698,598 | 10/1972 | Wood et al. . |
| 4,301,938 | 11/1981 | Wood et al. . |

OTHER PUBLICATIONS

B S & B Drawing No. M.S.1.5.20.
B S & B Drawing No. M.S.7.120.12.
B S & B Drawing No. 77-00-MS.1.7.3.
B S & B Drawing No. 77-00-MS.1.7.7.
B S & B Drawing No. 77-00-MS.1.7.8.
B S & B Drawing No. MS-1.5.13.

*Primary Examiner*—Steven M. Pollard
*Attorney, Agent, or Firm*—Laney, Dougherty, Hessin & Beavers

[57]  ABSTRACT

A vacuum support for use with a safety pressure relief rupture member. A vacuum support disk includes a convex side and a concave side with the convex side being positioned against a concave side of the rupture disk which also includes convex and concave sides. A arc-shaped slit, centered with respect to the vacuum support disk, is formed therethrough and permits fluid communication between either side of the vacuum support disk. A pair of opposed substantially parallel disk edges define opposte sides of the slit. The edges are urged against one another when the pressure on the concave side of the vacuum support disk is lower than the pressure on the convex side of the rupture disk thereby supporting the rupture disk.

44 Claims, 4 Drawing Sheets

SAFETY PRESSURE RELIEF DEVICE AND METHOD FOR MAKING THE SAME

This is a continuation of prior copending application Ser. No. 018,206, filed Feb. 24, 1987, now abandoned.

BACKGROUND OF THE INVENTION

1. Field of the Invention

This invention relates generally to safety pressure relief devices and more particularly, but not by way of limitation, to a safety pressure relief device designed for positive rupture in one direction at a pre-determined pressure differential to protect a pressure vessel. The invention also relates to methods for making such safety pressure relief devices.

2. Description of the Prior Art

A variety of safety pressure relief devices of the rupture disk type have been developed. Generally, these devices include a rupture disk supported between a pair of complementary supporting members or flanges which are in turn connected to a relief connection in a vessel or system containing fluid pressure.

Safety pressure relief devices of the rupture disk type are often used in environments having elevated temperatures, alternating pressure and vacuum and corrosive conditions. When such disks are exposed to alternating internal and external pressures the central portion of the disk fluctuates responsive to the pressure diferentials thus stressing the disk and ultimately leading to disk rupture at a pressure differential other than that for which the disk was designed. As used herein, the term "positive pressure" refers to a condition in which pressure in the vessel is greater than pressure on the other side of the safety pressure relief device while the term "reverse pressure" refers to a condition in which the vessel pressure is less than the pressure on the other side of the presure relief device.

In order to stablize the rupture disk against fluctuating in response to alternating internal and external pressure differentials, a vacuum support is clamped between the complementary flanges which contain the rupture disk with the vacuum support being positioned internally of the rupture disk. In some constructions, a sealing member is interposed between the vacuum support and the rupture disk. Thus, the vacuum support prevents fluctuation of the rupture disk or seal when a vacuum occurs in the pressure vessel in which the safety pressure relief device is installed. Examples of such supports are shown in U.S. Pats. No. 2,523,068 to Simpson et al. and U.S. Pat. No. 2,953,279 to Coffman.

A problem occurs with such prior art vacuum supports. In many applications, the vacuum support must be thick enough to support the rupture disk or seal in the presence of a high reverse pressure. At the same time, the vacuum support must also be able to open completely upon the occurrence of the positive pressure at which the rupture disk is designed to open. When the rupture disk is designed to open at a relatively low positive internal pressure, the vacuum support may be so thick that full opening of the assembly at the pre-determined positive pressure is prevented thus restricting flow.

Prior art vacuum supports typically include a plurality of petals defined by radial cuts in the vacuum support. Lugs are welded onto the vacuum support adjacent the cuts in order to maintain the structural integrity of the vacuum support in the presence of reverse pressure while a sufficient pre-determined positive pressure opens the petals upon bursting of the rupture disk. In the past, it has been necessary to design vacuum supports of varying thicknesses dependent upon the level of reverse pressure the vacuum support must withstand. Moreover, some design parameters are not achieveable using prior art vacuum supports. In other words, when it is desired to have the vacuum support withstand a very high reverse pressure while opening in the presence of a very low positive pressure, the vacuum support may be so thick that rupture of the disk at the positive pressure may not occur.

In addition to the foregoing problems, the lugs which are spot welded onto the prior art vacuum supports constitute surface irregularities upon which process in the vessel may accumulate. When such process is corrosive, especially in the presence of high temperatures, the effective life of the vacuum support is reduced.

It is important that when the internal pressure in the vessel reaches the pre-determined positive pressure at which the rupture disk opens, the vacuum support opens completely and fully while at the same time retaining parts so that vacuum support fragments are not sent downstream of the safety pressure relief device.

By the present invention, a safety pressure relief device of the rupture disk type is provided which includes a vacuum support which is simply and easily constructed, which opens completely and positively at low rupture disk pressures while supporting the rupture disk in the presence of a high reverse pressure, which is useable with rupture disks having a wide range of reverse pressure and rupture pressure ratings, and which opens positively and completely without fragmenting when internal vessel pressure exceeds rupture disk opening pressure.

SUMMARY OF THE INVENTION

The present invention relates to a vacuum support for use with a safety pressure relief rupture member. The vacuum support comprises a disk having a generally convex upper side and a generally concave lower side and a slit formed therethrough. An upper disk edge defines first, a generally upper side of the slit and a lower disk edge defines second, a generally lower side of the slit. The slit edges are pressed together with the lower disk edge supporting that portion of the disk generally above the slit responsive to downward force applied to the disk.

Another aspect of the invention comprises a method for making a vacuum support for use in a safety pressure relief device of the rupturable type. The method includes the steps of forming a disk having a convex upper side and a concave lower side. Thereafter a slit is formed through the disk which divides the same into generally lower and upper portions. The slit is narrow enough relative to the disk thickness to close and prevent the upper portion from collapsing downwardly into the lower portion responsive to downward pressure applied to the upper portion.

It is, therefore, an object of the present invention to provide an improved safety pressure relief device of the rupturable type.

It is a further object of the present invention to provide such a safety pressure relief device in which the rupture disk is supported in the presence of high reverse pressure and which opens positively and completely at a pre-determined positive low pressure.

It is another object of the present invention to provide such a safety pressure relief device which includes a vacuum support that is useable over a wide range of rupture disk reverse pressure and positive pressure ratings.

It is yet another object of the present invention to provide such a safety pressure relief device which is easily constructed and which incorporates fewer parts than those in the prior art.

It is still another object of the invention to provide such a safety pressure relief device having a vacuum support which is formed of thinner material than those in the prior art.

It is another object of the invention to provide such a safety pressure relief device which opens positively and completely at a pre-determined positive pressure and which does not fragment upon opening.

DETAILED DESCRIPTION OF THE PREFERRED EMBODIMENTS OF THE INVENTION

Figure 1:
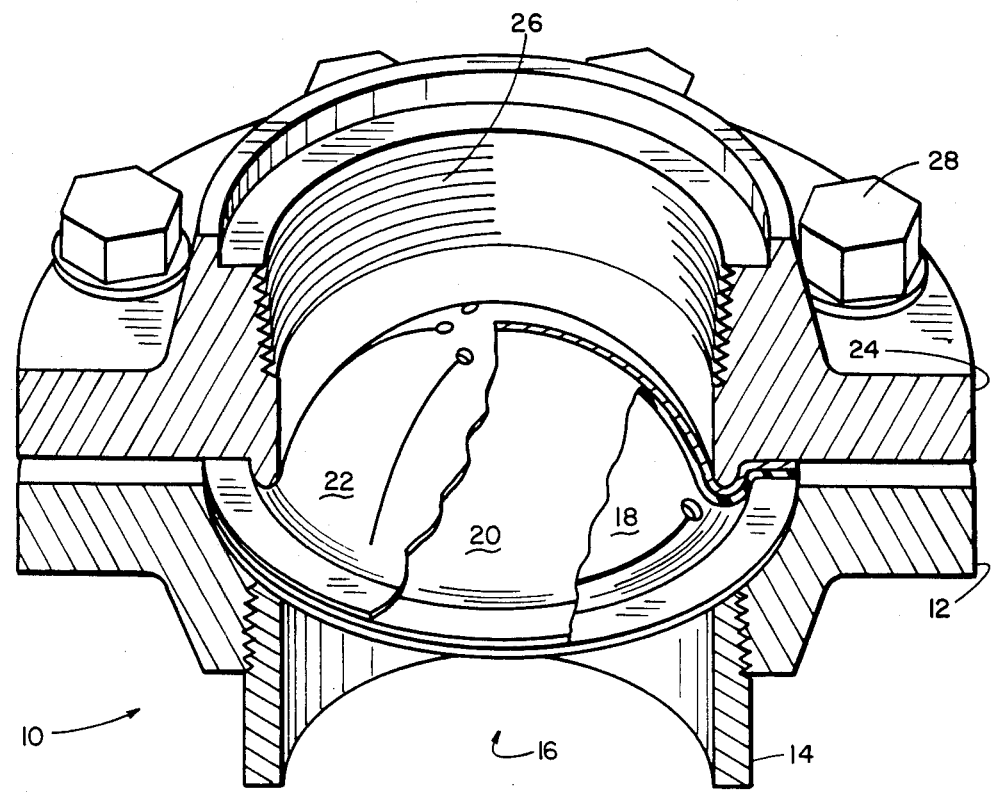
FIG. 1 is a partially sectioned perspective view of a safety pressure relief device constructed in accordance with the instant invention with portions thereof broken away.

Indicated generally at 10 is structure incorporating a safety pressure relief device constructed in accordance with the instant invention. A base flange 12 is threaded or otherwise suitably connected to a pipe or tubular member 14 which serves as the relieving outlet for a pressure vessel to be protected. Indicated generally at 16 is a safety pressure relief device constructed in accordance with the instant invention. Device 16 includes a vacuum support 18, a sealing member 20, and a rupture member or disk 22. Device 16 is installed between base flange 12 and a hold-down flange 24. The hold-down flange is generally provided with threads 26 or other suitable means of connecting piping (not shown) to vent fluids away from the vessel area when required. Flanges 12, 24 are bolted together via bolts, like bolt 28, as shown. Safety pressure relief device 16 serves as a gasket between flanges 12, 24 to provide a sealed connection for the pressure vessel.

Figure 2:
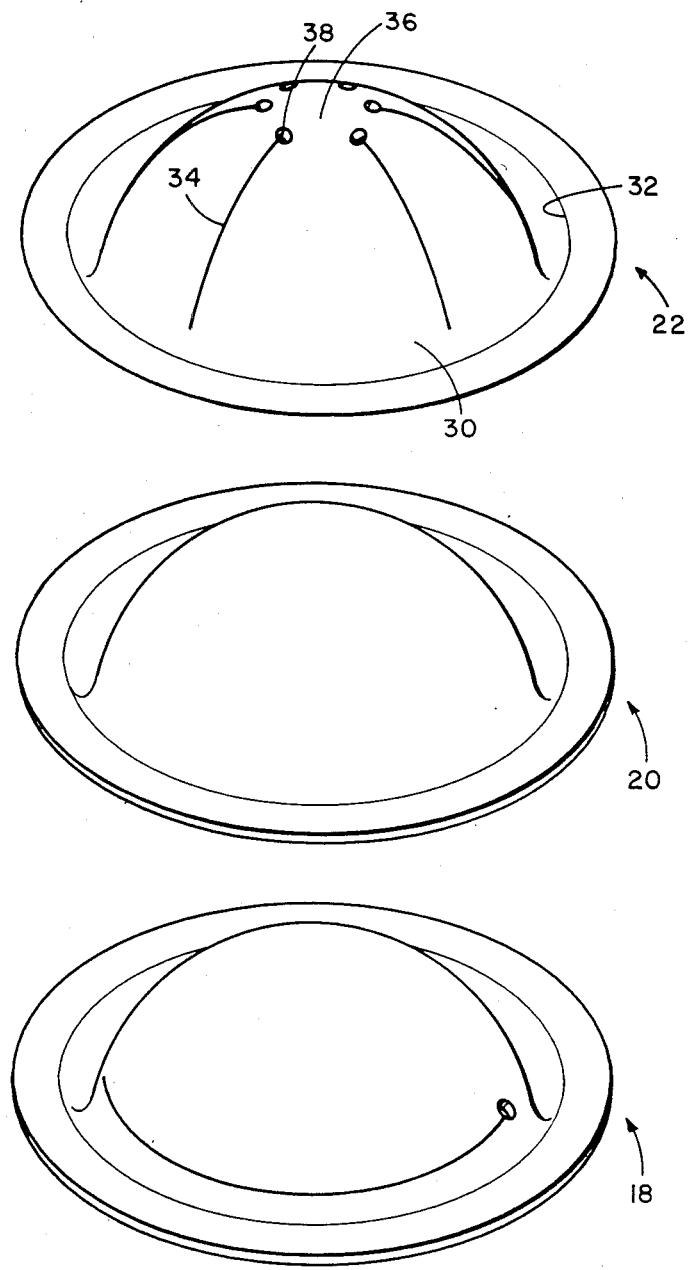
FIG. 2 is an exploded perspective view of the safety pressure relief device of FIG. 1.

Turning attention now to FIG. 2, rupture disk 22 includes an upper convex side 30 and a lower concave side (not visible in FIG. 2). Rupture member 22 includes an anchoring flange 32, such also being viewable in FIG. 7. A plurality of slots, like slot 34, extend radially outwardly from a solid central portion 36. A hole, like hole 38 is drilled or punched at the upper end of each of the slots, like slot 34, to prevent stress concentrations at the upper slot ends.

Rupture disk 22 is constructed to positively burst when the pressure in tubular member 14 exceeds the pressure on the other side of the pressure relief device by a pre-determined amount. The pre-determined pressure at which such bursting occurs for any diameter of the safety pressure relief device may be selected by varying metal thickness, tensile strength of the metal being considered, and varying the length of the slots, like slot 34. For example, the longer the slots, the closer their proximity at central portion 36 of rupture disk 22 and the smaller the area will be between the slots to resist the internal pressure of the vessel.

Sealing member 20 is made to conform with the shape of rupture disk 22 or must be of sufficient flexibility to assume such shape when assembled as part of the unit. Since the function of the sealing member is simply to prevent leakage through device 16 and to prevent corrosion of rupture disk 22, it may be made from a wide variety of materials. The selection of a material as a sealing member should be made individually for each installation with caution taken to assure the protection of rupture disk 22 from corrosion. It should be appreciated that it is known to combine sealing member 20 and rupture disk 22 into a single rupture disk which also seals to prevent leakage.

Figure 4:
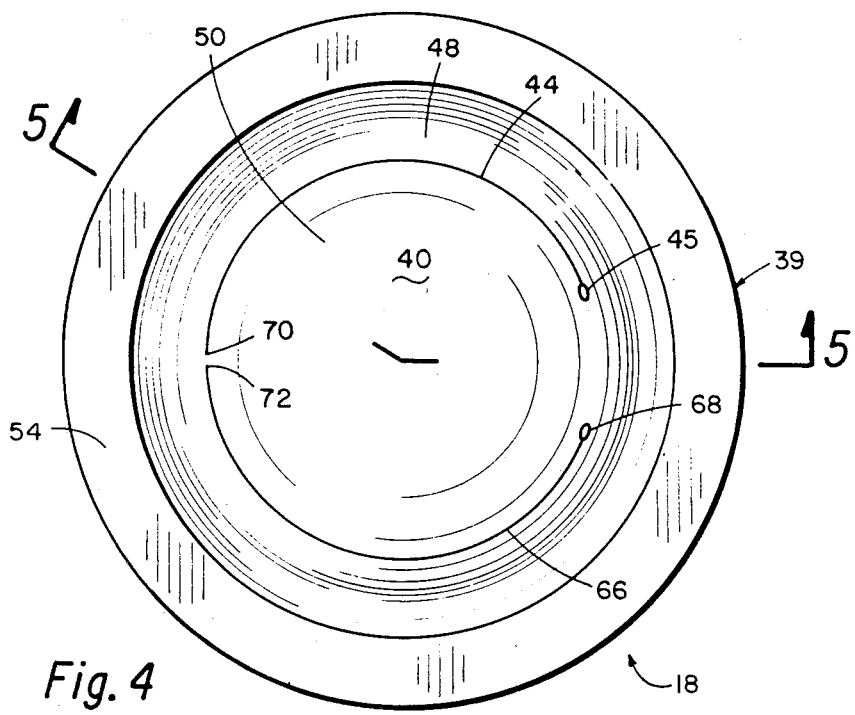
FIG. 4 is a top plan view of the vacuum support of the safety pressure relief device of FIG. 1.
Figure 5:
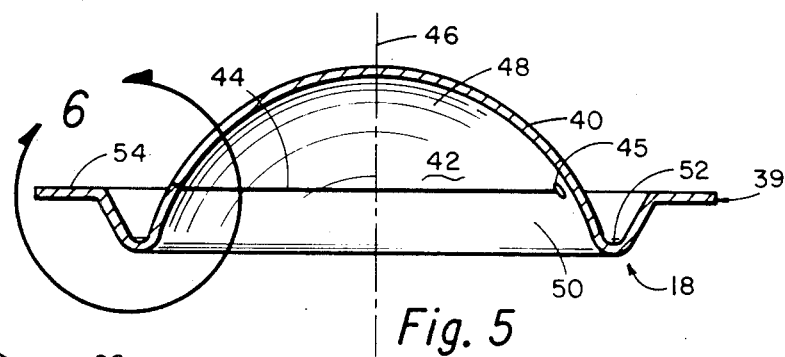
FIG. 5 is a view taken along line 5—5 in FIG. 4.
Figure 6:
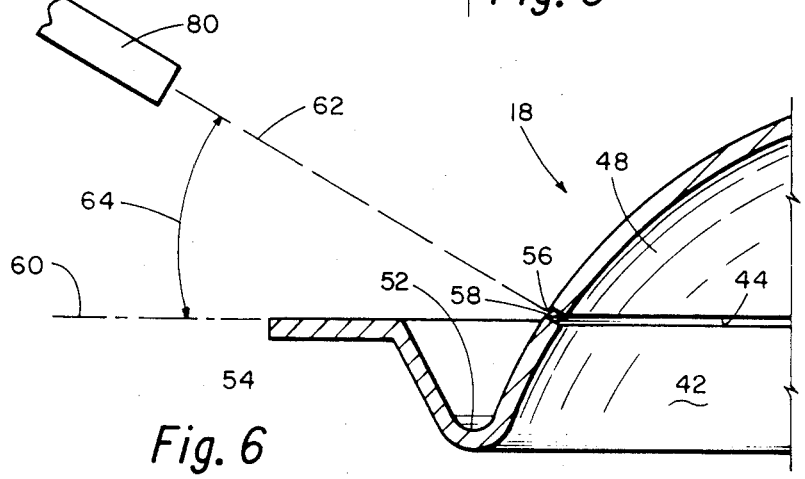
FIG. 6 is an enlarged view of a portion of FIG. 5.

Vacuum support 18 is shown in more detail in FIGS. 4–6 and attention is directed thereto for a description of the vacuum support structure. Vacuum support 18 includes a circular disk 39 having a generally convex upper side 40 and a generally concave lower side 42. A substantially horizontal (as viewed in FIG. 5) slit 44 is formed through vacuum support 18 and defines an arc centered about an axis designated by dot-dash line 46. One end of slit 44 terminates in a hole 45 to relieve stress concentrations. Axis 46 also comprises the central axis for disk 39. Slit 44 divides disk 39 into an upper disk portion 48 and a lower disk portion 50.

Figure 7:
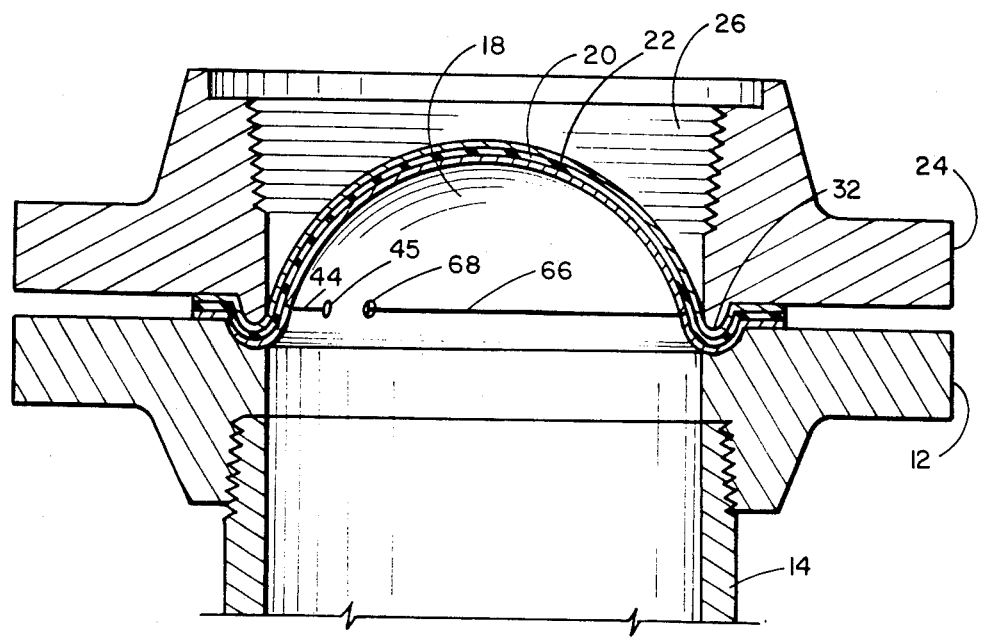
FIG. 7 is a cross-sectional view of the safety pressure relief device of FIG. 1.

An anchoring flange 52 is formed about the radially outer circumference of disk 39 and provides a means for anchoring device 16 between flanges 12, 24 when vacuum support 18, sealing member 20, and rupture disk 22 are nested together as shown in FIGS. 1 and 7. A flat arcuate portion 54 comprises the radially outermost edge of disk 39 and assists in anchoring the vacuum support between flanges 12, 24.

Slit 44 is defined by an first, upper edge 56 and a second, lower edge 58, such being referred to herein as an upper disk edge and a lower disk edge, respectively. The disk edges are substantially parallel to one another and in the instant embodiment of the invention each defines an angle of substantially 60° with respect to axis 46. A second axis 60 is shown in FIG. 6, such being normal to axis 46 and parallel with arcuate portion 54. A third axis 62 is parallel to disk edges 56, 58. Thus, in the instant embodiment of the invention, the angle between axes 60, 62, designated by arc 64 (hereinafter angle 64) is substantially 30°. It has been found that the safety pressure relief device of the invention will successfully operate, as will hereinafter be described in more detail, when disk edges 56, 58 are oriented so that angle 64 is within the range of 0°–45°.

A second slit 66 is formed through disk 39 and is symmetrical with respect with slit 44. Like slit 44, slit 66 includes a hole 68 at one end thereof to relieve stress concentrations. Although not visible in the drawings, slit 66 includes first and second edges, like edges 56, 58, which are parallel to one another and which, like edges 56, 58, form an angle of substantially 60° with respect to axis 46. Each of slits 44, 66 have one end which terminates in holes 45, 68 and another end 70, 72, respectively. That portion of the disk between holes 45, 68 is referred to herein as a vacuum support hinge portion and that portion of the disk between ends 70, 72 is referred to herein as a vacuum support positioning portion. The vacuum support positioning portion maintains upper portion 48 in alignment with lower portion 50 when vacuum support 18, sealing member 20, and rupture disk 22 are nested together for assembly as shown in FIGS. 1 and 7.

In operation, vacuum support 18, sealing member 20, and rupture disk 22 are assembled between flanges 12, 24 as previously described and as shown in FIGS. 1 and 7. The pressure on the vessel to be protected operates on the concave side of sealing member 20 through slits 44, 66 and holes 45, 68 in vacuum support 18. When properly assembled, sealing member 20 nests in the concave side of rupture disk 22 so that pressure transmitted to sealing member 20 is exerted by the sealing member against the concave side of rupture disk 22.

When pressure in tubular member 14 falls below the presure on the convex side of rupture disk 22, vacuum support 18 prevents substantial flexing of rupture disk 22 and sealing member 20 in response to fluctuating presure. In response to the lower presure internal of tubular member 14, a downward force is exerted by seal 20 against vacuum support 18 thus pressing upper edge 56 of slit 44 against lower edge 58 and likewise pressing the upper and lower edges of slit 66 together so that the vacuum support assumes the configuration of FIG. 3. Due to the dome shape of vacuum support 18 and the abutment of the slit edges flat against one another, vacuum support 18 is able to maintain the configuration of FIG. 3 even in the presence of very high reverse pressures. This is so even when the vacuum support is made from thinner material than used in prior art vacuum supports.

Figure 8:
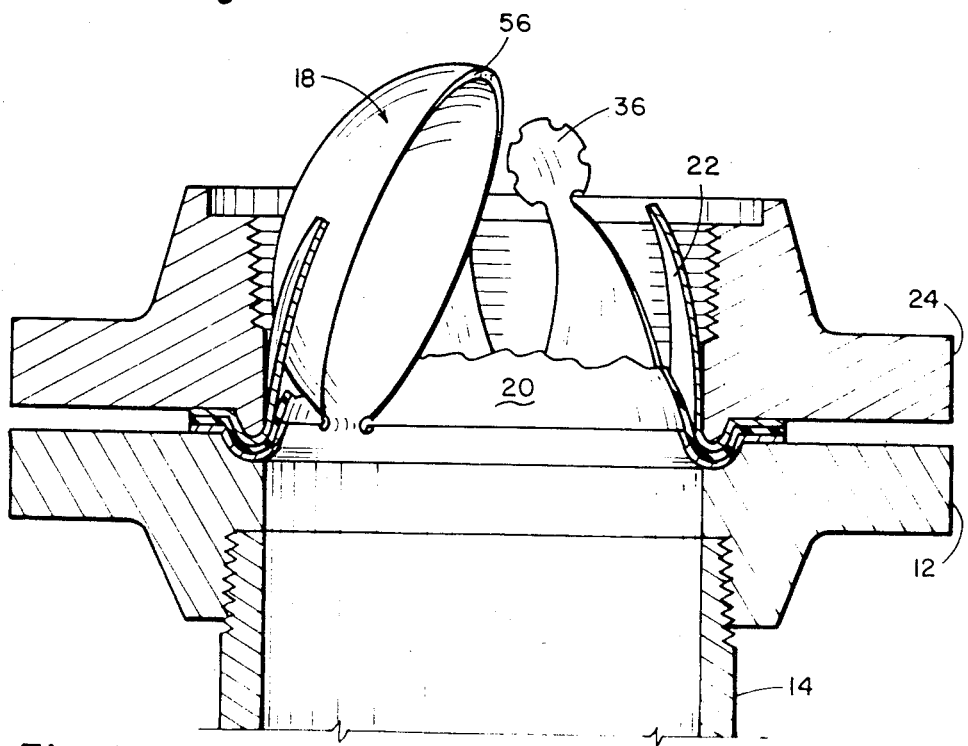
FIG. 8 is a view similar to FIG. 7 after rupture of the safety pressure relief device.

Pressure interior of tubular member 14 which is greater than pressure on the other side of safety device 16 acts against sealing member 20 on the lower side of rupture disk 22. When such pressure reaches the level at which disk 22 is designed to burst, the metal between the holes (like hole 38 in the upper portion of disk 22) separates, except for one set of holes as shown in FIG. 8, thus permitting the disk to open as shown. When rupture disk 22 opens, the pressure causes seal 20 to tear and vacuum support 18 to hinge open as shown in FIG. 8. As can be seen, the material between slit ends 70, 72 breaks thus permitting the vacuum support to hinge open as shown in FIG. 8.

Vacuum support 18 may be designed to assure that it will withstand a reverse pressure differential of a selected amount without collapsing. The strength of the vacuum support when exposed to reverse pressure is determined by the radial distance between axis 46 and slits 44, 66; angle 64; the thickness of the disk; and the width of the slits, i.e., for slit 44, the distance between edges 56, 58. The degree of positive pressure which the vacuum support will withstand is a function of the thickness of the disk and the distance between ends 70, 72.

It is to be appreciated that the slit width will vary dependent upon the thickness of the disk from which the vacuum support is made and the distance between ends 70, 72 will vary dependent upon the diameter of the rupture disk which in turn is dependent upon the diameter of the rupture disk with which the vacuum support is used.

Figure 3:
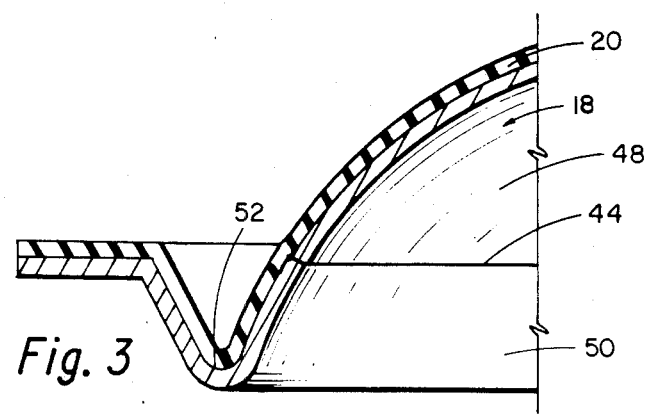
FIG. 3 is an enlarged partial cross-sectional view of a portion of the safety pressure relief device of FIG. 1.

It can be seen that the structure of the vacuum support of the invention is able to withstand high reverse pressures because of the manner in which the slit closes with lower disk portion 50 supporting upper disk portion 48 as shown in FIG. 3. This improved vacuum support structure withstands higher reverse pressures than previous vacuum supports and can be formed from thinner material than previous vacuum supports. Thus, the vacuum support of the invention withstands very high reverse pressures while at the same time, because of the thin material from which the vacuum support disk is made, opens positively and completely at low positive pressures. Thus, unlike prior art vacuum supports, for a given rupture disk size, the vacuum support of the instant invention may be used over a wide range of positive and reverse pressure ratings for its associated rupture disk.

Figure 10:
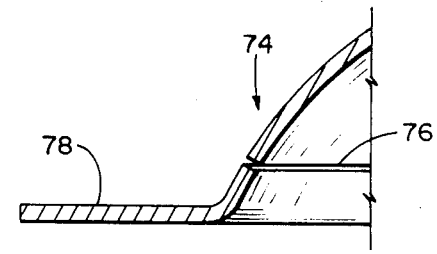
FIG. 10 is an enlarged view of a portion of FIG. 9.
Figure 9:
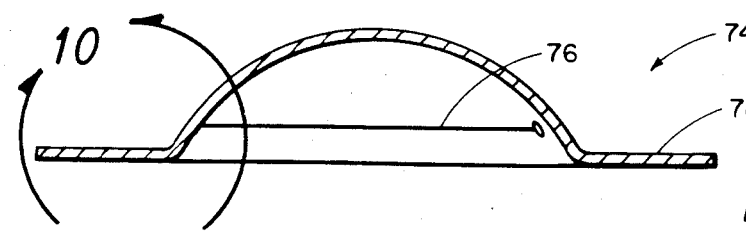
FIG. 9 is a cross-sectional view of a second embodiment of a vacuum support constructed in accordance with the instant invention.

Indicated generally at 74 in FIGS. 9 and 10 is a second embodiment of a vacuum support constructed in accordance with the instant invention. Vacuum support 74 includes a pair of symmetrical slits, one of which is slit 76, formed through a domeshaped portion of the vacuum support similar to vacuum support 18. Vacuum support 74 includes a substantially planar radial flange 78 which is used to mount the vacuum support in a type of mounting flange different from flanges 12, 24 in FIG. 1. Otherwise, vacuum support 74 functions in the same manner (with an associated rupture disk and seal, each of which have planar flanges similar to flange 78) as the embodiment of FIG. 1. It is to be appreciated that means other than those disclosed herein for mounting a vacuum support constructed in accordance with the instant invention may be utilized without departing the scope of the invention.

Turning now to FIG. 6, included therein is a laser 80. When making vacuum support 18, laser 80 is used to form slits 44, 66 with a laser light beam being aligned with axis 62 thereby forming the slit edges 56, 58 at an angle dependent upon the orientation of laser 80. Laser 80 provides precision control in selecting both the angle of edges 56, 58 and the width of slit 44 thus enabling the vacuum support to be precisely designed to withstand a given amount of reverse pressure. A vacuum support so constructed includes fewer parts than vacuum supports of the prior art which typically have lugs spot welded thereto adjacent cuts which are formed through disk 39 in order to withstand reverse pressure to a preselected amount.

It is to be appreciated that additions and modifications may be made to the embodiments disclosed herein without departing from the spirit of the invention which is defined in the following claims.

We claim:

1. A vacuum support for using with a safety pressure relief rupture member comprising:
 a disk having a convex side and a concave side, and defining a slit through said disk sides having a pair of opposing ends, wherein said disk includes:
  an upper disk portion generally above said slit, said upper disk portion being positionable against one side of the rupture member for supporting the rupture member when the pressure on said concave side of said disk is lower than the pressure on the other side of the rupture member;
  a lower disk portion generally below said slit;

a vacuum support hinge defined between said opposing slit ends for swinging movement of said upper disk portion relative to said lower disk portion; and means for supporting said upper disk portion against swinging movement on said vacuum support hinge in a direction away from the rupture member in the presence of reverse pressure, said supporting means consisting solely of a pair of opposed substantially planar disk edges defining opposite sides of said slit, said edges being urged substantially flushly against one another when the pressure on said concave side of said disk is lower than the pressure on the other side of the rupture member.

2. The vacuum support of claim 1 wherein a distance between said disk edges is less than a thickness of said disk.

3. The vacuum support of claim 1 wherein said disk defines a second slit through said disk sides.

4. The vacuum support of claim 3 wherein said slits have a second pair of opposing ends defining a vacuum support positioning portion therebetween.

5. The vacuum support of claim 4 wherein said vacuum support positioning portion is substantially shorter than said vacuum support hinge.

6. The vacuum support of claim 1 wherein said slit defines an arc.

7. The vacuum support of claim 6 wherein said disk defines a second slit through said disk sides, said second slit defining an arc such that said arcs together define an arc greater than 270°.

8. The vacuum support of claim 6 wherein said convex side, said concave side, and said arc are centered on a common axis.

9. The vacuum support of claim 8 wherein said disk edges form an angle of between 45° to 90° with said axis.

10. The vacuum support of claim 9 wherein said angle is substantially 60°.

11. A vacuum support comprising:
a disk having a generally convex upper side and a generally concave lower side, said disk having a slit formed therethrough and further including:
a vacuum support hinge defined by a pair of opposing ends of said slit, said vacuum support hinge allowing swinging movement of that portion of said disk generally above said slit relative to that portion of said disk generally below said slit;
a substantially planar upper disk edge defining a generally upper side of said slit; and
a substantially planar lower disk edge defining a generally lower side of said slit, said disk edges being pressed substantially flushly together by downward force applied to said disk with said lower edge solely supporting that portion of said disk generally above said slit against downward swinging motion.

12. The vacuum support of claim 11 wherein said slit is substantially horizontal.

13. The vacuum support of claim 11 wherein said upper and lower disk edges are substantially parallel to one another.

14. The vacuum support of claim 11 wherein a distance between said upper and lower disk edges is less than a thickness of said disk.

15. The vacuum support of claim 11 wherein said disk defines a second slit through said disk sides.

16. The vacuum support of claim 15 wherein said slits have a second pair of opposing ends defining a vacuum support positioning portion therebetween.

17. The vacuum support of claim 16 wherein said vacuum support positioning portion is substantially shorter than said vacuum support hinge.

18. The vacuum support of claim 11 wherein said slit defines an arc.

19. The vacuum support of claim 18 wherein said disk defines a second slit through said disk sides, said second slit defining an arc such that said arcs together define an arc greater than 270°.

20. The vacuum support of claim 18 wherein said convex side, said concave side, and said arc are centered on a common axis.

21. The vacuum support of claim 20 wherein said disk edges form an angle of between 45° to 90° with said axis.

22. The vacuum support of claim 21 wherein said angle is substantially 60°.

23. A vacuum support comprising:
a disk having a generally convex upper side and a generally concave lower side, and defining a slit through said disk sides having a pair of opposing slit ends, wherein said disk includes:
an upper disk portion located generally above said slit;
a lower disk portion located generally below said slit;
a vacuum support hinge defined between said opposing slit ends for swinging movement of said upper disk portion relative to said lower disk portion;
means for preventing said upper disk portion from swinging downwardly through said lower disk portion, said means consisting solely of opposed substantially planar upper and lower disk edges defining generally upper and lower sides, respectively, of said slit, said edges substantially flushly abutting one another responsive to downward pressure applied to said upper disk portion.

24. The vacuum support of claim 23 wherein the opposed substantially planar upper and lower disk edges define opposite sides of said slit.

25. The vacuum support of claim 23 wherein a distance between said upper and lower disk edges is less than a thickness of said disk.

26. The vacuum support of claim 23 wherein said disk defines a second slit through said disk sides.

27. The vacuum support of claim 26 wherein said slits have a second pair of opposing ends defining a vacuum support positioning portion therebetween.

28. The vacuum support of claim 27 wherein said vacuum support positioning portion is substantially shorter than said vacuum support hinge.

29. The vacuum support of claim 23 wherein said slit defines an arc.

30. The vacuum support of claim 29 wherein said disk defines a second slit through said disk sides, said second slit defining an arc such that said arcs together define an arc greater than 270°.

31. The vacuum support of claim 29 wherein said convex side, said concave side, and said arc are centered on a common axis.

32. The vacuum support of claim 31 wherein said disk edges form an angle of between 45° to 90° with said axis.

33. The vacuum support of claim 32 wherein said angle is substantially 60°.

34. A vacuum support for use with a safety pressure relief rupture member comprising:
   a disk having a convex side and a concave side, and defining a slit through said disk sides having a pair of opposing ends, wherein said disk includes:
   a pair of opposed disk edges which define first and second sides of said slit;
   an upper disk portion positioned above said first side of said slit and positionable against one side of the rupture member for supporting the rupture member when the pressure on said concave side of said disk is lower than the pressure on the other side of the rupture member;
   a lower disk portion positioned below said second side of said slit;
   a vacuum support hinge defined between said opposing slit ends for swinging movement of said upper disk portion relative to said lower disk portion; and
   means for supporting said upper disk portion against swinging movement on said vacuum support hinge in a direction away from the rupture member in the presence of reverse pressure, said supporting means consisting solely of said pair of opposed disk edges, said edges being urged into contact with one another when the pressure on said concave side of said disk is lower than the pressure on the other side of the rupture member.

35. The vacuum support of claim 34 wherein each of said opposed disk edges is substantially planar.

36. The vacuum support of claim 34 wherein a distance between said disk edges is less than a thickness of said disk.

37. The vacuum support of claim 34 wherein said disk defines a second slit through said disk sides.

38. The vacuum support of claim 37 wherein said first and second slits have a second pair of opposing ends defining a vacuum support positioning portion therebetween.

39. The vacuum support of claim 38 wherein said vacuum support positioning portion is substantially shorter than said vacuum support hinge.

40. The vacuum support of claim 34 wherein said slit defines an arc.

41. The vacuum support of claim 40 wherein said disk defines a second slit through said disk sides, said second slit defining an arc such that said arcs together define an arc greater than 270°.

42. The vacuum support of claim 40 wherein said convex side, said concave side, and said arc are centered on a common axis.

43. The vacuum support of claim 42 wherein said disk edges form an angle between 45° to 90° with said axis.

44. The vacuum support of claim 43 wherein said angle is substantially 60°.

* * * * *